ated Aug. 19, 1969

3,462,420
PARABANIC ACID DERIVATIVES

Paul J. Stoffel, St. Louis, Mo., assignor to Monsanto Company, St. Louis, Mo., a corporation of Delaware
No Drawing. Continuation-in-part of application Ser. No. 488,743, Sept. 20, 1965. This application Dec. 8, 1966, Ser. No. 600,018
Int. Cl. C07d 49/30; A01n 9/16; C07c 157/12
U.S. Cl. 260—239.9  8 Claims

ABSTRACT OF THE DISCLOSURE

Compound of the formula

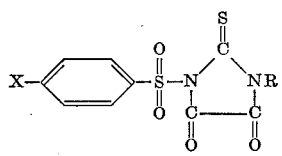

wherein X is selected from the class consisting of amino, nitro and alkyl of not more than 4 carbon atoms, and R is selected from the class consisting of hydrogen, alkyl and alkenyl of not more than 12 carbon atoms are useful as phytotoxicants.

---

This application is a continuation-in-part of application Ser. No. 488,743, filed Sept. 20, 1965, and now abandoned.

This invention relates to parabanic acid derivatives which are useful as biological toxicants, particularly phytotoxicants.

The parabanic acid derivatives of this invention can be represented by the formula

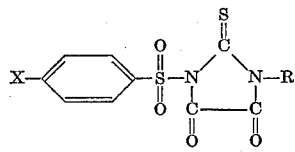

wherein X is selected from the group consisting of nitro, alkyl of not more than 4 carbon atoms and amino, and R is selected from the group consisting of hydrogen, alkyl of not more than 12 carbon atoms and alkenyl of not more than 12 carbon atoms.

The parabanic acid derivatives of this invention can be prepared by reacting oxalyl chloride with para-substituted benzenesulfonyl thioureas having the R substituent. The substituted thioureas can be prepared by reacting para-substituted benzenesulfonyl isothiocyanate with a primary amine or a secondary amine having the R substitutent. Many of the thioureas which are reacted with oxalyl chloride in accordance with this invention can be prepared by processes disclosed in Martin et al. U.S. Patent No. 2,411,661.

The reaction is usually carried out at temperatures from about 40° C. to about 150° C. in the presence of an aromatic hydrocarbon medium. Suitable aromatic hydrocarbon media include benzene, toluene, xylene and the like. The reaction is preferably carried out by slowly adding oxalyl chloride to an admixture of para-substituted benzenesulfonyl thiourea and aromatic organic media, and heating the reaction mixture at reflux until the emulsion of hydrogen chloride substantially ceases.

The desired product can be separated from the reation mixture by conventional means for example distillation, extraction and the like.

The following examples will illustrate the invention. In these examples, as well as in the specification and appended claims, parts and percent are by weight unless otherwise indicated.

EXAMPLE 1

About one mole of oxalyl chloride is added dropwise to about one mole of p-nitrobenzenesulfonyl thiourea in benzene at about 25° C. Upon evolution of hydrogen chloride, the reaction mixture is heated at reflux for about two hours. The product is 1 - (p-nitrobenzenesulfonyl) thioparabanic acid.

EXAMPLE 2

A solution of 1 - (p-aminobenzenesulfonyl) - 3 - ethyl thiourea in ethylene dichloride is treated by dropwise addition of oxalyl chloride and the mixture heated to reflux. After the evolution of hydrogen chloride has substantially ceased, the following crystalline product is recovered from the reaction mixture:

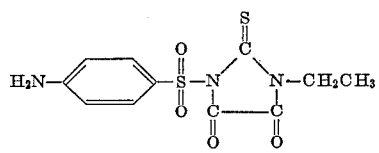

[1-(p-aminobenzenesulfonyl)-3-ethylthioparabanic acid]

EXAMPLE 3

The procedure of Example 1 is repeated using 1-(p-methylbenzenesulfonyl) - 3 - (2 - ethylhexyl)thiourea in place of p-nitrobenzenesulfonyl thiourea to form 1 - (p-methylbenzenesulfonyl) - 3 - (2-ethylhexyl)thioparabanic acid.

Following substantially the same procedure as in the foregoing examples, the following compounds of this invention are prepared:

1-(p-aminobenzenesulfonyl)-3-n-butylthioparabanic acid
1-(p-ethylbenzenesulfonyl)-3-ethylthioparabanic acid
1-(p-n-butylbenzenesulfonyl)-3-methylthioparabanic acid
1-(p-aminobenzenesulfonyl)-3-allylthioparabanic acid
1-(p-nitrobenzenesulfonyl)-3-dodecylthioparabanic acid
1-(p-nitrobenzenesulfonyl)-3-(2-pentenyl)thioparabanic acid The parabanic acid derivatives of this invention are useful for controlling or modifying the growth of plants. They are effective as general phytotoxicants including postemergent phytotoxicants and preemergent phytotoxicants, but their most outstanding utility is as preemergent phytotoxicants. Furthermore, these compounds are characterized by a broad spectrum of herbicidal or phytotoxic activity, i.e., they modify the growth of a wide variety of plant systems including both monocotyledonous and dicotyledonous plants. For the sake of brevity and simplicity the term "active ingredient" will be used hereinafter in this specification to describe the parabanic acid derivatives of the above formula.

When operating in accordance with the present invention, effective amounts of the active ingredients are dispersed in soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid phytotoxic compositions to the surface of soil or to plant systems can be carried out by conventional methods, e.g., power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the phytotoxicants.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient used. In foliar treatment for the control or modification of vegetative growth, the active ingredients are supplied in amounts from about 1 to about 50 or more pounds per acre. In applications to soil for the control or modification of the growth of germinant seeds, emerging seedlings and established vegetation, the active ingredients are applied in amounts from about 0.01 to about 25 or more pounds per acre. In such soil applications, it is desirable that the active ingredients be distributed to a depth of at least 0.2 inch and preferably in amounts from about 0.01 to about 5 pounds per acre.

The active ingredients can be used alone or in combination with a material referred to in the art as a phytotoxic adjuvant in liquid or solid form. The phytotoxic compositions are prepared by admixing the active ingredient with an adjuvant including diluents, extenders, carriers and conditioning agents to provide compositions in the form of finely divided particulate solids, granules, pellets, solutions and aqueous dispersions or emulsions. Thus the active ingredient can be used with an adjuvant such as a finely divided particulate solid, a liquid of organic origin, water, a wetting agent, dispersing agent, an emulsifying agent or any suitable combination of these.

Typical finely divided solid carriers and extenders which can be used in the phytotoxic compositions include for example, the talcs, clays, pumice, silica, diatomaceous earth, quartz, fuller's earth, salt, sulfur, powdered cork, powdered wood walnut flour, chalk, tobacco dust, charcoals, volcanic ash, and the like. Typical liquid diluents include for example water, kerosene, Stoddard solvent, hexane, benzene, toluene, acetone, ethylene dichloride, xylene, alcohols, Diesel oil, glycols and the like.

The phytotoxic compositons, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents, emulsifying agents and the like are included therein.

Surface-active agents which can be used in the phytotoxic compositions of this invention are set out, for example, in Searle U.S. Patent 2,426,417, Todd U.S. Patent 2,655,447, Jones U.S. Patent 2,412,510, and Lenher U.S. Patent 2,139,276. A detailed list of such agents is also set forth by J. W. McCutcheon in "Soap and Chemical Specialties," November 1947, page 8011 et seq., entitled "Snythetic Detergents"; "Detergents and Emulisfiers—Up to Date" (1960), by J. W. McCutcheon, Inc., and Bulletin E–607 of the Bureau of Entomology and Plant Quarantine of the U.S.D.A. In general, less than 15 parts by weight of the surface active agent is present per 100 parts by weight of phytotoxic composition.

Although the invention is described with respect to specific modifications, the details thereof are not to be construed as limitations except to the extent indicated in the following claims.

The embodiments of the invention in which an exclusive property or privilege is claimed are defined as follows.

I claim:
1. Compound of the formula

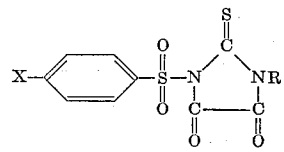

wherein X is selected from the class consisting of amino, nitro and alkyl of not more than 4 carbon atoms, and R is selected from the class consisting of hydrogen, alkyl and alkenyl of not more than 12 carbon atoms.

2. Compound of claim 1 wherein R in alkyl.
3. Compound of claim 1 wherein R is alkenyl.
4. Compound of claim 1 wherein R is hydrogen.
5. Compound of claim 1 wherein X is amino.
6. Compound of claim 1 wherein X is nitro.
7. Compound of claim 1 which is 1-(p-nitrobenzenesulfonyl)thioparabanic acid.
8. Compound of claim 1 which is 1-(p-aminobenzenesulfonyl)-3-ethylthioparabanic acid.

References Cited

Chem. Abst. (abstract of Japanese Patent 13,013), vol. 55, column 1528 (1961).

Chem. Abst. (abstract of Japanese Patent 15,783), vol. 55, column 11,362 (1961).

Stoffel: Jour. Org. Chem., vol. 29, pages 2794–6 (Sept. 11, 1964).

HENRY R. JILES, Primary Examiner

NATALE TROUSOF, Assistant Examiner

U.S. Cl. X.R.

71—92; 260—309.5, 397.7, 552